United States Patent [19]

Aigeldinger et al.

[11] Patent Number: 5,558,773
[45] Date of Patent: Sep. 24, 1996

[54] METHOD FOR PRODUCING AND DRYING A FILTER CAKE, WHILE AVOIDING ENTERING OF THE FILTER CAKE INTO A THERMOPLASTIC PHASE

[75] Inventors: Jean-Claude Aigeldinger, Wittnau, Switzerland; Egon Hoffmann, Rheinfelden, Germany

[73] Assignee: Bertrams Dehydrat AG, Muttenz, Switzerland

[21] Appl. No.: 256,204
[22] PCT Filed: Nov. 19, 1993
[86] PCT No.: PCT/CH93/00263
   § 371 Date: Sep. 9, 1994
   § 102(e) Date: Sep. 9, 1994
[87] PCT Pub. No.: WO94/13382
   PCT Pub. Date: Jun. 23, 1994

[30] Foreign Application Priority Data

Dec. 4, 1992 [CH] Switzerland ............... 03 735/92
Nov. 4, 1993 [CH] Switzerland ............... 03 319/93

[51] Int. Cl.⁶ ................................................ B01D 37/00
[52] U.S. Cl. ........................... 210/770; 210/774; 210/180
[58] Field of Search ............................. 210/650, 770, 210/774, 175, 180, 805, 149, 295, 224, 231, 230, 232, 416.1, 85, 90

[56] References Cited

U.S. PATENT DOCUMENTS

| 4,116,831 | 9/1978 | Keat | 210/771 |
|---|---|---|---|
| 4,346,003 | 8/1982 | Polyakov et al. | 210/225 |
| 4,722,789 | 2/1988 | Kupka | 210/231 |
| 4,999,118 | 3/1991 | Beltchev | 210/771 |
| 5,092,983 | 3/1992 | Eppig et al. | 208/323 |
| 5,143,609 | 9/1992 | Beltchev | 210/225 |
| 5,160,490 | 11/1992 | Mérai | 210/770 |
| 5,185,084 | 2/1993 | LaPidus et al. | 210/90 |

FOREIGN PATENT DOCUMENTS

| 166715 | 1/1986 | European Pat. Off. . |
|---|---|---|
| 178389 | 4/1986 | European Pat. Off. . |
| 263197 | 4/1988 | European Pat. Off. . |
| 3713419 | 11/1988 | Germany . |
| 3901851 | 7/1990 | Germany . |

*Primary Examiner*—Ana Fortuna
*Attorney, Agent, or Firm*—Cushman Darby & Cushman, L.L.P.

[57] ABSTRACT

A transportable plant for processing a slurry by means of a chamber filter press designed as a membrane press contains at the same time a feed system for producing the slurry and diverse machinery for influencing temperature and pressure in the interior of the chamber filter press, such as a superheated steam unit, a hot air unit and a vacuum plant, which can be connected to the interior of the plant via switchable or controllable valves. The plant is suitable particularly for producing materials which are flowable or are in pieces, for example colorants, soup and drink powders, vegetable snacks and fruit snacks and diverse pharmaceuticals and for processing sewage sludge by filtration and subsequent drying or freeze-drying of the filter cake in the chamber filter press.

6 Claims, 5 Drawing Sheets

5,558,773

METHOD FOR PRODUCING AND DRYING A FILTER CAKE, WHILE AVOIDING ENTERING OF THE FILTER CAKE INTO A THERMOPLASTIC PHASE

BACKGROUND OF THE INVENTION

The invention relates to a plant for processing a slurry and a method for operating the same.

Such plants are used in sludge dewatering engineering, in particular in food engineering and pharmaceutical engineering, but also in the disposal of sewage sludge and the like for separating the solids portion contained in the slurry from the liquid portion.

Corresponding plants are also known which, in addition to a chamber filter press, include a heating unit and a suction or vacuum pump (DE-A-3 901 851, EP-A-0 263 197), but the suction or vacuum pump only serves for removing the filtrate by suction.

In many uses, the filter cake, which forms in the chamber filter press from the suspended matter contained in the slurry, is further processed, in particular, dried. For this it must, in conventional plants, be removed from the filter press and recharged into a drying plant which, if the necessary cleaning operations and the keeping-sterile of the filter cake, generally required principally in the medical sector, are taken into consideration, represents a highly complex operation.

SUMMARY OF THE INVENTION

The object therefore underlying the invention is to provide a design of such plants which permits, with little additional expenditure, a relatively extensive processing of the slurry, and methods for its operation, which offer particular advantages.

The invention, creates a plant in which further processing is possible, in particular, a gentle drying of the filter cake without removal of the same from the chamber filter press. As a result, an extensive processing of the slurry is made possible in a relatively simple plant and the course of the process is made considerably simpler and cheaper. The plant can be constructed to be very compact and can be designed to be mobile.

In plants according to the invention, the circumstance that the filter cake in a chamber filter press is in any case produced so that it offers a large surface area—this is also necessary in the interests of a rapid filtration process—is also utilized in subsequent process steps. Thus, a chamber filter press for treating the filter cake with reduced pressure, down to sustantial vacuum is ultimately suitable, but it is also outstandingly suitable for contact heating of the filter cake. Favorable preconditions likewise prevail for heating by hot gas, since for a fine distribution of the same, the feed line or the filtrate line with their branches or both can be utilized.

BRIEF DESCRIPTION OF THE DRAWINGS

In the following, the invention is described in more detail on the basis of the figures depicting only one embodiment: In the drawings.

DETAILED DESCRIPTION

Figure 1:
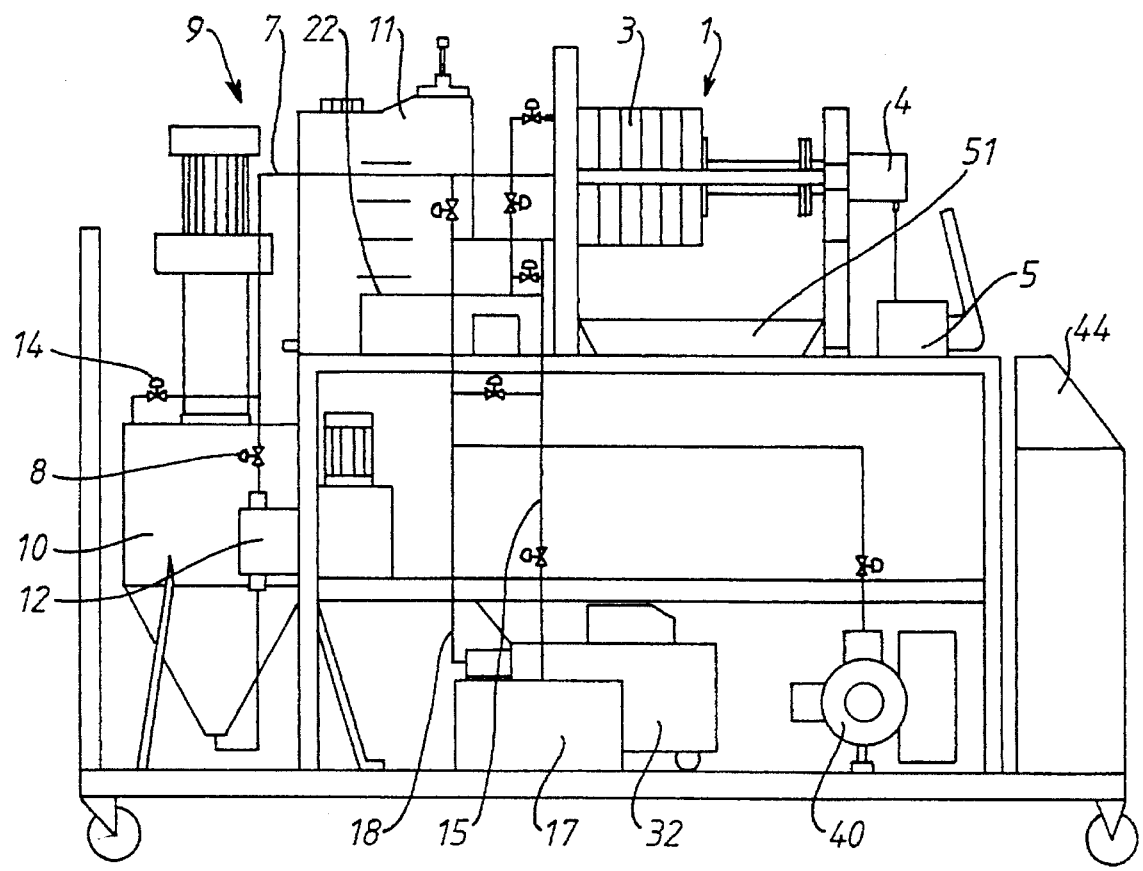
FIG. 1 shows a diagrammatic side view of a plant according to the invention.
Figure 2A:
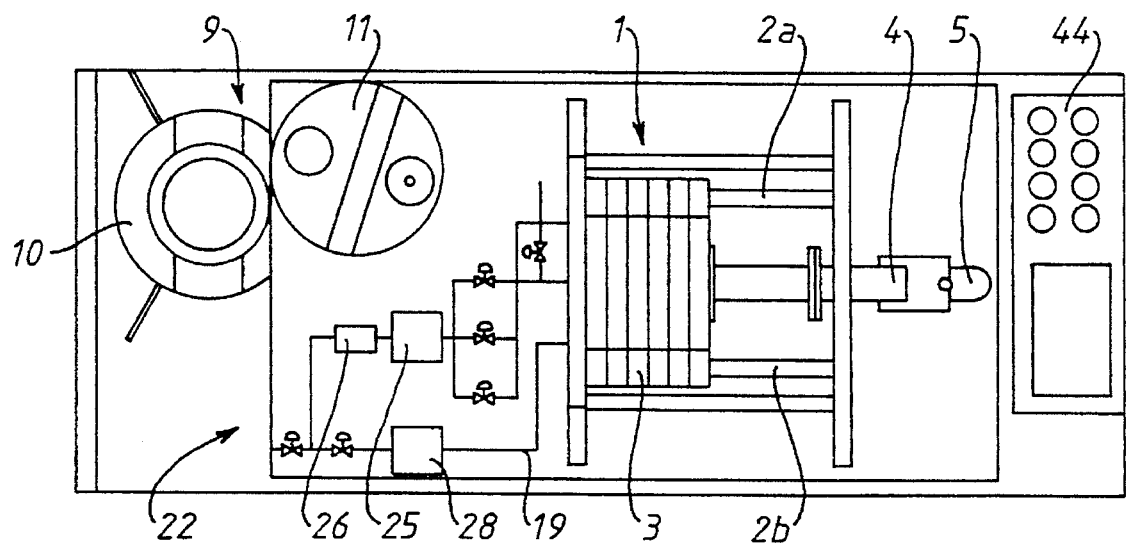
FIG. 2a shows a diagrammatic plan view of the plant as in FIG. 1.
Figure 2B:
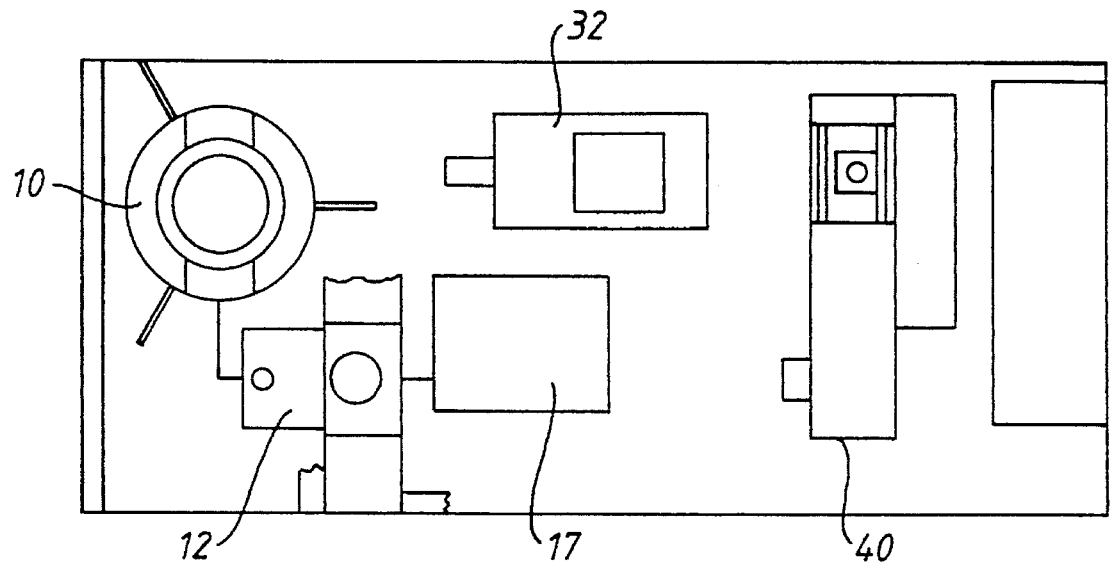
FIG. 2b shows a plan view corresponding to FIG. 2a, but in which the top machinery is removed.
Figure 4:
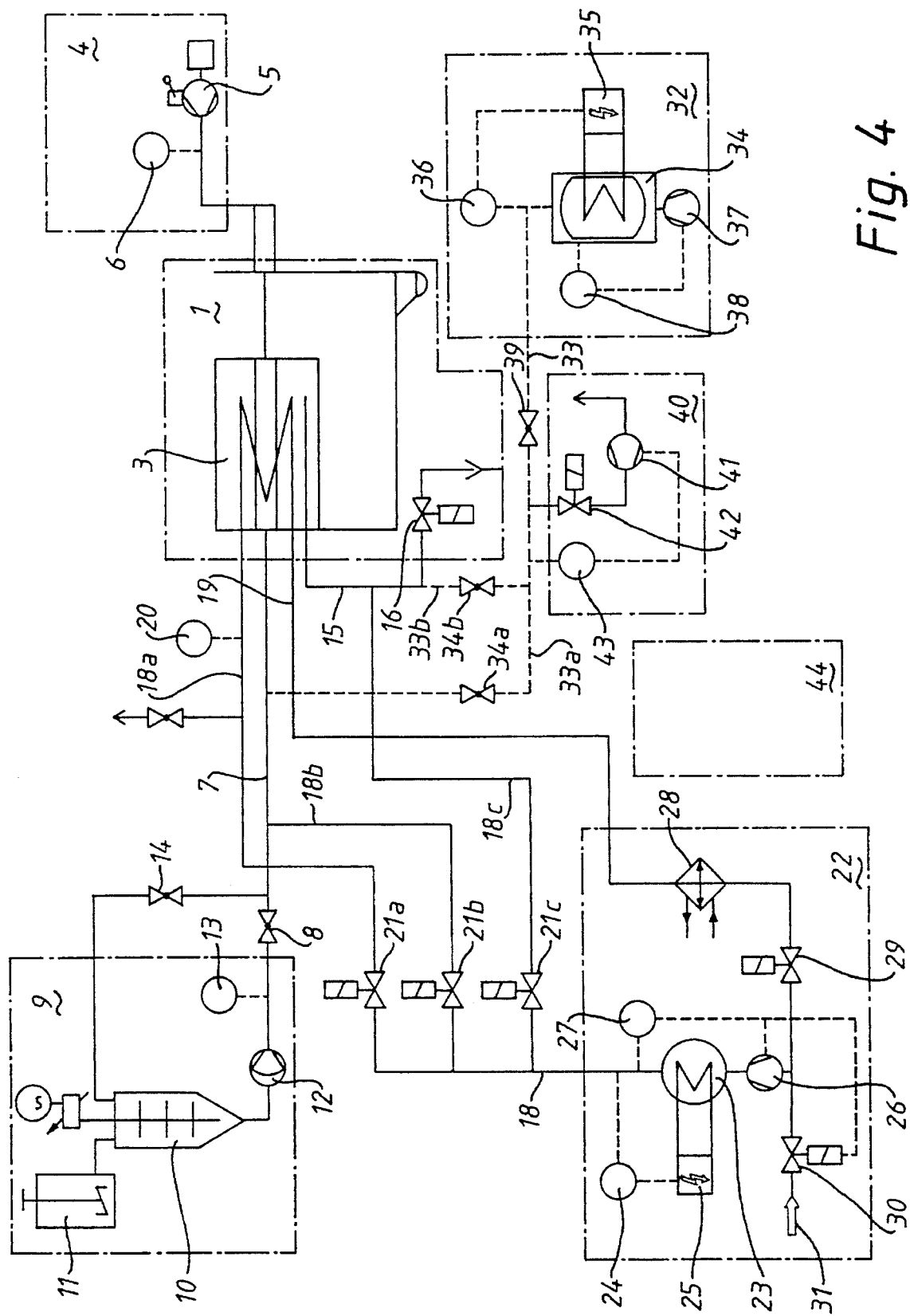
FIG. 4 shows a diagrammatic representation of the principle of the plant as in FIGS. 1, 2a, 2b.

The structure of the plant is described in principle below, with reference in particular to FIG. 4, which shows the machinery with its components and the connections between them in all details, while FIGS. 1, 2a, 2b are intended chiefly to show a possible spatial arrangement of the machinery.

The plant has, in its upper part, a chamber filter press 1 having chamber filter plates 3 suspended on bars 2a,b (FIGS. 1, 2a), which chamber filter plates can be pressed together by a hydraulic unit 4 having a pump 5 and a pressure sensor 6. The filter press 1 is connected via a feed line 7 and a valve 8 to a feed system 9 which includes a stirred tank 10 and, upstream of the stirred tank 10, a flocculation reactor 11 and, connected downstream of the stirred tank 10, a charging pump 12, which can be designed as a piston membrane pump or a screw centrifugal impeller pump and, for control of the charging pump 12, a pressure sensor 13 arranged between the charging pump 12 and the valve 8. The feed line 7 is further connected to the stirred tank 10 via a return line having a further valve 14.

So that settling of the solids portion is avoided, the feed line 7, instead of being disposed at a central height as depicted, can alternatively open out below or above into the chamber filter press 1, or a plurality of openings can be present between or among which the flow is switched. Thus, solids suspensions in which the solids portion has a tendency to sedimentation, can be fed from above, and those in which it has a tendency to flotation can be fed from below.

The chamber filter press 1 is connected, via a filtration line 15 having a controllable valve 16, to a filtrate vessel 17 (FIGS. 1, 2b). Since the filter press is designed as a membrane press—which is described in still more detail further below in connection with FIG. 3—it is also connected to a first branch 18a of a pressure line 18, and to a return line 19. The pressure line 18, which simultaneously represents, with its branches, a heating line, is monitored by a temperature sensor 20. The pressure line 18 leads, via a controllable valve 21a, to a superheated steam unit 22, more precisely to the outlet of a boiler 23 of the unit 22. The superheated steam unit 22 has, moreover, a temperature controller 24, which controls the output of an electrical heating device 25, for heating the boiler 23 on the basis of the temperature in the pressure line 18, and a circulation pump 26, which is controlled in a similar manner by a pressure controller 27, and a condenser 28, via which the return line 19 is connected to the inlet of the circulation pump 26, via a controllable valve 29. A water connection 31 is, moreover, connected upstream of the circulation pump 26, via a valve 30 controlled by the pressure controller 27. Instead of the superheated steam unit, a hot water unit or other heat transfer medium unit could be provided. The pressure line 18 has two further branches 18b and 18c, which open out via controllable valves 21b and 21c into the feed line 7 and the filtrate line 15, respectively.

Apart from the superheated steam unit 22, the plant has a further heating apparatus, that is a hot air unit 32, which is connected to the chamber filter press 1 via a branch 33a, opening out into the feed line 7, having a valve 34a and a branch 33b, opening out into the filtrate line 15, having a valve 34b of a pressure line 33 which, with its branches, simultaneously represents a heating line. The hot air unit 32 includes a heating apparatus 34, through which flows compressed air, having a heating device 35 which is controlled by a temperature controller 36. The compressed air is generated by a pressure pump 37 which is connected upstream of the heating apparatus 34 and is controlled by a pressure controller 38 so that the hot air unit 32 simultaneously represents a compressed air unit.

Separated from the hot air unit 32 by a valve 39, a vacuum plant 40 is additionally connected to the pressure line 33, so that the pressure line 33 equally serves as an evacuation line. The vacuum plant 40 includes a vacuum pump 41, downstream of which is connected a controllable valve 42 and a pressure controller 43, which controls the vacuum pump 41 in dependence on the pressure prevailing in the pressure line 33.

The plant described is controlled by a controller 44 from where the valves are opened and closed manually or according to a selectable program and the individual units and plants are controlled, for instance by presetting defined pressures and temperatures. Preferably, pressures from approximately 0.1 mbar to approximately 16 bar should be capable of being established in the chamber filter press 1 by the pressure pumps 37 integrated into the hot air unit 32 and the vacuum pump 41 and, by use of the heating apparatus 34 or the boiler 23, temperatures between −45° C. and 250° C. should be capable of being established, temperatures beneath the ambient temperature being achieved by the vacuum pump 41, so that a refrigeration unit is not necessary. Obviously, however, the plant described, if required, can also be equipped with such a unit. The vacuum pump 41 is furnished with a condenser in which the vapors taken off are condensed or desublimated to reduce their volume.

Figure 3:
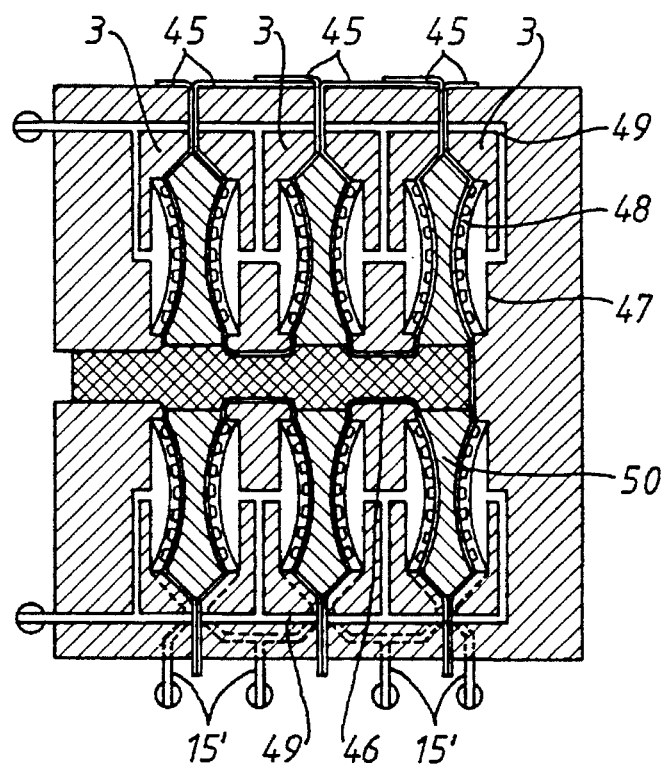
FIG. 3 shows a diagrammatic longitudinal section through a part of the plant as in FIGS. 1, 2a, 2b.

FIG. 3 shows, in longitudinal section, the principal item of the chamber filter press 1, that is the chamber filter plates 3, which are covered by liquid-permeable filter cloths 45 and are pressed together by the hydraulic unit 4. The chamber filter plates 3 are furnished centrally with continuous orifices 46 forming a continuation of the feed line 7, and have recesses 47 on both sides, at the base of each of which is arranged a membrane 48. The recesses 47 form chambers connected by the orifices 46, into the bottom region of which chambers open out branches 15' of the filtrate line 15. The chambers are completely lined by the filter cloths 45. The chamber filter plates 3 additionally have pressure channels 49 which open out behind the membranes 48 and are connected to the branch 18a of the pressure line 18 and to the return line 19.

The interior of the chamber filter press 1 is filled, via the feed line 7 and the orifices 46, with slurry from the feed system 9. The filtrate runs through the filter cloths 45, into the branches 15' of the filtrate line 15, and is passed via the branches 15' into the filtrate vessel 17. A filter cake 50 remains in the cavities. It can be squeezed by introducing steam into the pressure channels 49 via the branch 18a of the pressure line 18, which, as depicted in FIG. 3, effects a bulging of the membrane 48 into the chambers.

The chamber filter press 1 can alternatively be equipped with chamber filter plates without a membrane, in which case the pressure channels open out into cavities in the filter plates, which, for example, are formed by cast-in hollow bodies, and, through which, via the branch 18a of the pressure line 18 and return line 19, a steam circulation can flow, which is closed by the condenser 28, the circulation pump 26 and the boiler 23. In both cases, steam introduced can achieve a heating of the filter cake 50 by direct or, at any rate since the filter cloths 45 form only a thin intermediate layer, almost direct contact, in one case, contact with the membranes 48, in the other, with the chamber filter plates themselves, which, at least in the latter case, should be composed of metal because of the higher heat conductivity of this material, which is also to be preferred because of its heat resistance, although in this regard plastic plates are also adequate for many applications. Of course, electric heating of the filter plates can be provided as well.

Beneath the chamber filter press 1 is arranged a trough 51 (FIG. 1) for receiving the filter cake 50 after opening the chamber filter press 1. The plant is accommodated in a relatively small volume of approximately 2×1.4×0.8 m$^3$, and is transportable.

Figure 5:
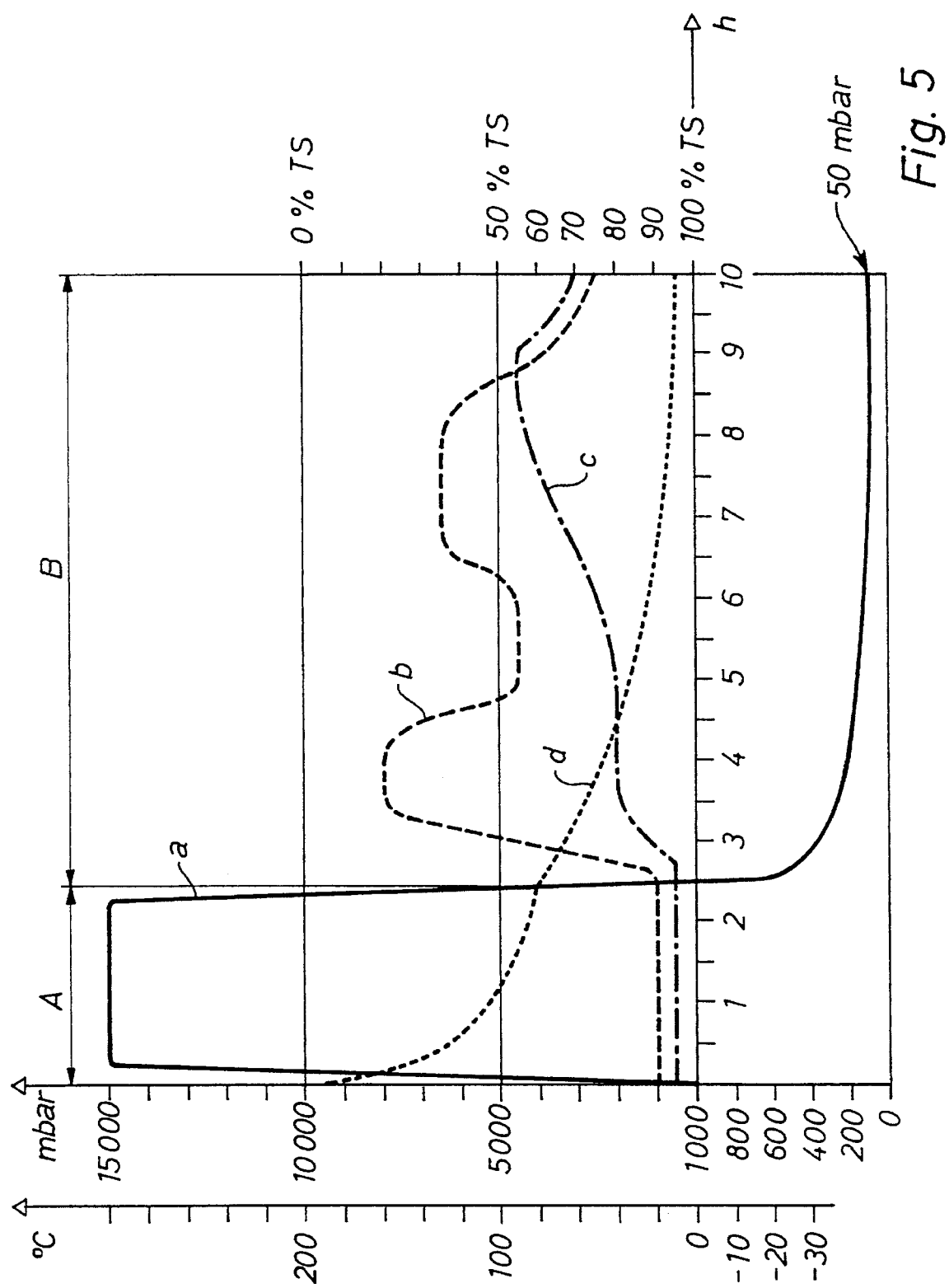
FIG. 5 shows the change with time of various parameters during filtration and subsequent drying of the filter cake and FIG. 6 shows the change with time of various parameters during filtration and subsequent freeze-drying of the filter cake.
Figure 6:
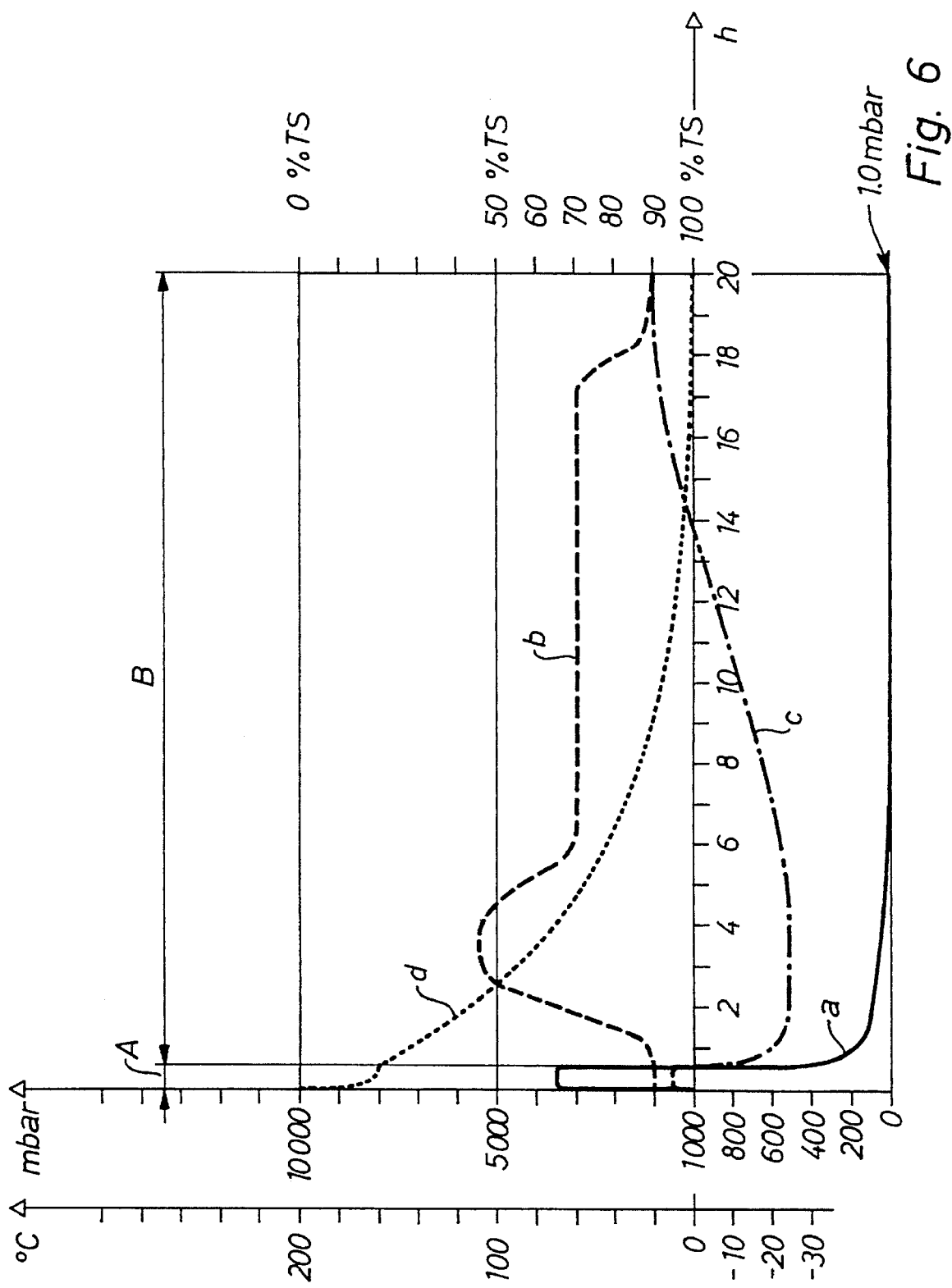

As is indicated by FIGS. 5 and 6, the plant can be used to produce a filter cake 50 and further treat the same, in particular for the production of a material which is pourable or in pieces depending on circumstances—colourants, pharmaceuticals, soup and drink powders, vegetable and fruit snacks and many others are suitable—, various combinations being possible for the further treatment. The plant is particularly highly suitable for processes which include the filtration A of the filter cake 50 with subsequent drying B of the filter cake in the chamber filter press 1. A slurry is first produced in the flocculation reactor 11 and is continuously passed into the stirred tank 10 and is there stirred as long as necessary. The valve 8 is then opened and the feed pump 12 is turned on. As a result, slurry is transported into the chamber filter press 1 until (see below) only little filtrate exits because a solid filter cake has formed in the chamber filter press 1. The valve 8 is then closed and the valve 14 and the valves 39 and 34a are opened, and the feed line 7 is blown out by the pump 37. While the chamber filter press 1 is being filled, the majority of the filtrate drains by gravity through the filtrate line 15 into the filtrate vessel 17. Opening the valve 21a and turning on the circulation pump 26 passes water or alternatively steam through the first branch 18a of the pressure line 18 into the pressure channels 49 of the chamber filter press 1, so that the membranes 48 bulge and squeeze, and possibly at the same time somewhat heat the filter cake 50. Water or steam is then discharged via the return line 19.

The further treatment is oriented, just as are certain parameters in the filtration A, depending on the type of the slurry and the intended final result. In the example of FIG. 5, the slurry is a chemical suspension, mineral sludge, sewage sludge or flue gas scrubber sludge of between 0.5% and 35% (by weight)—approximately 5% in the example shown—dry matter (DM). The pressure a in the interior of the chamber filter press 1 is increased in the filtration to 15 bar, and maintained for approximately 2.5 h.

When the filtrate flow has fallen below a defined limit, the drying B begins, more precisely, vacuum drying of the filter cake in the chamber filter press 1 begins. For this purpose, the vacuum plant 40 is put into operation, and the pressure a in the interior of the chamber filter press 1 is reduced to a value between 5 and 100 mbar, in the example indicated, 50 mbar, and maintained. In addition, heating is carried out by the heating device 25 of the boiler 23, steam is generated, and finally the valves 21a are opened, so that the filter cake 50 is heated by steam flowing into the pressure channels 49 via the membranes 48 of the chamber filter plates 3, the plate temperature b of which is brought to between 140° C. and 200° C., in the present case 160° C.

In practicing the drying step of the foregoing embodiment of the present invention, the interior of the chamber filter press is maintained beneath an upper limit of at most 200 mbar, preferably above a lower limit pressure of 5 mbar and, preferably below an upper limit pressure of 7 mbar.

Meanwhile, the temperature of the chamber filter plates is maintained above a lower limit of at least 40° C., preferably between a lower limit of 70° C. and an upper limit of 160° C. or 200° C.

During the drying step, the temperature of the chamber filter plates is maintained so that the temperature of the filter cake does not exceed 60° C., and, preferably does not exceed 50° C., as long as the dry matter contents of the filter cake lies between 65% and 85% by weight.

The cake temperature c constantly remains below 50° C., in this case because of the evaporation. It foams and becomes finely porous, which it remains also in further course with suitable direction of the parameters pressure a and plate temperature b. If the evaporation decreases, the temperature of the chamber filter plates 3 is reduced to approximately 70° C. The cake temperature c must not increase above 60° C. for as long as the content of dry matter d is between 65% and 85%, since the filter cake 50 otherwise enters into the thermoplastic phase—also termed the glue phase—and assumes a pasty consistency so that it becomes lumpy and also sticks to the chamber filter plates 3. After exceeding the limit of 85% DM, the plate temperature is increased to 140° C. and, after approximately 2 h, the heating is turned off. The filter cake 50 is further dried by the reduced pressure for a further 2 h as far as approximately 95% DM, while the cake temperature c decreases to approximately 70° C. The pressure a is then made atmospheric and the chamber filter press 1 is opened.

In an additional method (FIG. 6), a maximum pressure of 2–6, in the present case 3.5, bar is not exceeded in the filtration lasting only approximately 15 min of a solids suspension from food, pharmaceutical or chemical production, e.g. of fruit pieces or vegetable pieces in a 5-fold to 20-fold liquid excess. For the subsequent freeze-drying, the pressure a is decreased to 0.5 to 2 mbar, here 1 mbar—in any case beneath the triple point pressure of water—and the filter cake 50 is intensively cooled as a result. The cake temperature c decreases to approximately −20° C., so that the water portion, if it has not already evaporated, changes over into the solid phase. Thus, also here, the filter cake remains loose and further dewatering is not prevented. The plate temperature b is then increased to 80° to 110° C. and later reduced to approximately 70° C., so that the cake temperature c also slowly increases, so that the water portion in the filter cake 50 is progressively sublimated, and the content of dry matter d increases to 98 to 99%. The reduction of the plate temperature b to approximately 70° C. is carried out to protect the filter cake, at least when the evaporation is no longer sufficient to prevent an elevation of the cake temperature c to above 50° C.

The boundary between vacuum drying and freeze-drying is essentially given by the pressure course; strictly, it is at the triple point pressure of water which is 6.3 mbar for distilled water, but can also be beneath this to a greater or lesser extent, depending on the salt or sugar content. Subjecting also sludges and the like to a freeze-drying is obviously not excluded, but this higher expense is conventionally not necessary, whereas it is usually worthwhile in the case of more sensitive products, which obviously, vice versa, can alternatively be subjected to a vacuum drying.

In both methods, the drying of the filter cake 50 can be monitored, and pressure and temperature can be controlled according to the degree of drying. Such monitoring is possible, for example, by one or more of the following measures:

measuring the temperature in the interior of the filter cake 50, measuring the amount of condensate which is formed in the condenser of the vacuum pump 41, monitoring the pressure course during the drying.

As an additional step, for example principally in an application in the pharmaceutical sector and with the plant suitably equipped, sterilization by superheated steam can be carried out after the filtration A. For this purpose, with the valves 21b and 21c open, steam is pumped through the branches 18b, c of the pressure line 18 from the circulation pump 26 into the chamber filter press 1. After the valves 21b, c are closed, the filter cake 50 can be predried by hot air from the hot air unit 32 which flows into the chamber filter press 1 via the branches 33a,b of the pressure line 33 when the valves 34a,b are open. The drying B can then be completed, as described, by vacuum drying or freeze-drying.

We claim:

1. A method for producing and drying a filter cake, while avoiding entering of the filter cake into a thermoplastic phase, comprising:

feeding a suspension into a chamber filter press, in which the suspension is filtered by a plurality of chamber filter plates, to produce a filter cake;

drying the filter cake under a reduced pressure in the interior of the chamber filter press beneath an upper limit of at most 200 mbar, and an increased temperature of said chamber filter plates being above a lower limit of at least 40° C., while controlling the pressure in the interior of the chamber filter press and the temperature of the chamber filter plates so that the temperature of the filter cake does not exceed 60° C. as long as dry matter contents of the filter cake lies between 65% and 85%, by weight.

2. The method of claim 1, wherein:

during said drying step, the pressure in the interior of said chamber filter press is maintained above a lower limit pressure of 5 mbar, and the temperature of said chamber filter plates is maintained between a lower limit temperature of 70° C. and an upper limit temperature of 200° C.

3. The method of claim 2, wherein:

said suspension is one selected from a group consisting of a chemical suspension, a mineral sludge, a sewage sludge, and a flue gas scrubber sludge.

4. The method of claim 1, wherein:

during said drying step, the pressure in the interior of said chamber filter press is maintained below an upper limit pressure of 7 mbar, and the temperature of said chamber filter plates is maintained between a lower limit temperature of 40° C. and an upper limit temperature of 160° C.

5. The method of claim 4, wherein:

said suspension is a suspension of solids from a line for processing a commodity selected from the group consisting of vegetables, fruits, pharmaceuticals and chemicals.

6. The method of claim 5, wherein:

during said drying step, the pressure in the interior of said chamber filter press and the temperature of said chamber filter plates are so maintained that the temperature of said filter cake does not exceed 50° C.

* * * * *